United States Patent
Ross

Patent Number: 5,880,775
Date of Patent: Mar. 9, 1999

[54] METHOD AND APPARATUS FOR DETECTING CHANGES IN A VIDEO DISPLAY

[75] Inventor: Jay B. Ross, Pennington, N.J.

[73] Assignee: Videofaxx, Inc., Lambertsville, N.J.

[21] Appl. No.: 787,255

[22] Filed: Jan. 24, 1997

Related U.S. Application Data

[63] Continuation of Ser. No. 107,255, Aug. 16, 1993, abandoned.

[51] Int. Cl.$^6$ .................................................... H04N 7/18
[52] U.S. Cl. .......................... 348/143; 348/155; 348/152
[58] Field of Search ..................................... 358/105, 108, 358/125, 126, 103, 109; 379/53; 348/155, 82, 143, 150, 152, 153, 154, 161

[56] References Cited

U.S. PATENT DOCUMENTS

| | | | |
|---|---|---|---|
| 4,160,998 | 7/1979 | Kamin | 358/105 |
| 4,249,207 | 2/1981 | Harman et al. | 348/143 |
| 4,458,266 | 7/1984 | Mahoney | 348/155 |
| 4,931,868 | 6/1990 | Kadar | 348/155 |
| 5,091,780 | 2/1992 | Pomerleau | 358/108 |
| 5,216,502 | 6/1993 | Katz | 358/108 |
| 5,272,527 | 12/1993 | Watanabe | 379/53 |

*Primary Examiner*—Tommy P. Chin
*Assistant Examiner*—Vu Le
*Attorney, Agent, or Firm*—Gregory M. Howison

[57] ABSTRACT

A scene change monitor includes a camera (12) for monitoring a given scene. The camera (12) is operable to sequentially generate frames (18) of visual information, which frames are then divided up into pixels and the value of the pixels for each frame accumulated in an accumulator (25). The accumulator (25) provides on the output thereof a frame value for each frame (18) and stores this value in a register (22). A difference generator (24) is operable to generate the difference between select ones of the registers (22) for select ones of the frames (18) and generate a difference value for input to a comparator (26). The comparator (26) compares the difference value to a scene change threshold and, if it exceeds this value, a VCR activation signal is generated for turning a VCR (16) on to record the scene.

28 Claims, 7 Drawing Sheets

| | F1 | F2 | F3 | F4 | F5 | F6 | F7 | F8 |
|---|---|---|---|---|---|---|---|---|
| F1 | 0 | -10 | 0 | 5 | 200 | 400 | 200 | 15 |
| F2 | -10 | 0 | -10 | 15 | 210 | 410 | 210 | 25 |
| F3 | 0 | -10 | 0 | 5 | 200 | 400 | 200 | 15 |
| F4 | 5 | 15 | 5 | 0 | 195 | 395 | 195 | 10 |
| F5 | 200 | | 200 | 195 | 0 | 200 | 200 | -185 |
| F6 | 400 | 410 | 400 | 395 | 200 | 0 | -200 | -385 |
| F7 | 200 | 210 | 200 | 195 | 200 | -200 | 0 | -185 |
| F8 | 15 | 25 | 15 | 10 | -185 | -385 | -185 | 0 |

METHOD AND APPARATUS FOR DETECTING CHANGES IN A VIDEO DISPLAY

This application is a Continuation of application Ser. No. 08/107,255, filed Aug. 16, 1993, now abandoned.

TECHNICAL FIELD OF THE INVENTION

This invention pertains in general to a video system and, more particularly, to systems that detect changes in a given scene or video display.

BACKGROUND OF THE INVENTION

Present security systems typically utilize some type of video surveillance. These video surveillance systems can be both active and/or passive. In active systems, a security person is employed to view a plurality of displays and alert the appropriate authorities in the event that suspicious activity occurs in the display. These can be of two types, a constant monitoring system wherein the individual views all displays simultaneously, a system wherein the individual continually views one monitor and switches to different remote cameras, or a system wherein security personnel periodically activate remote cameras and send the images over a phone line in a "freeze frame" format. In a passive system, a VCR is disposed at the remote location and is operable to record slow motion video by only recording certain frames. These are typically found in banks or other financial institutions. This allows security personnel at a later time to view the tapes if something has occurred.

One of the problems with passive video surveillance systems is that an individual must be employed full time to view the monitors and, further, that individual must be alert. For the substantial portion of the time that the individual is viewing the monitors, little is happening. As such, such devices referred to as "scene change monitors" have been employed to compare one video frame with another and determine if there has been a change in the frames. However, these scene change monitors have one disadvantage in that they are very memory intensive. They must store an entire video frame in what is referred to as a "frame buffer" and then compare frame buffers on a pixel-by-pixel basis. If the accumulated change over the frames stored in the frame buffer is great in accordance with a predetermined algorithm, this can set off an alarm.

SUMMARY OF THE INVENTION

The present invention disclosed and claimed herein comprises a scene change monitor. The scene change monitor includes a display device for converting a scene into a plurality of pixels to represent a frame of pixels at a given time. The display device is also operable to generate a plurality of sequential frames of the pixels, each of the pixels having a video value representing the relative intensity of the pixels in the frame. An accumulator is operable to generate a single value for each of the frames, the single value greater than the average intensity of substantially all the pixels associated therewith. The single value is stored in a memory such that each of the frames output by the display device is stored therein. A comparison circuit then compares select ones of the single values and outputs a scene change alarm if the comparison of the select single values meet predetermined comparison values.

In another aspect of the present invention, the comparator circuit comprises a difference generator for generating the difference between the select ones of the single values. The output of the difference circuit is then compared with a predetermined threshold and, if the difference value exceeds the threshold, the scene change alarm is output.

In a further aspect of the present invention, the scene is divided into a plurality of zones. The accumulator is operable to discriminate the pixels for each of the zones in each of the frames and generate a single value for each of the zones in each of the frames such that there are multiple single values for each frame. The single values represent the average intensity of the sum of all the pixels in each of the zones. Normally it is operable to store the single values. Further, the display device is operable to scan multiple adjacent scenes such that sequential frames correspond to sequential ones of the scenes, the scenes being repeated in a cyclical manner. The comparison circuit is operable to compare only single values associated with frames from corresponding scenes.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
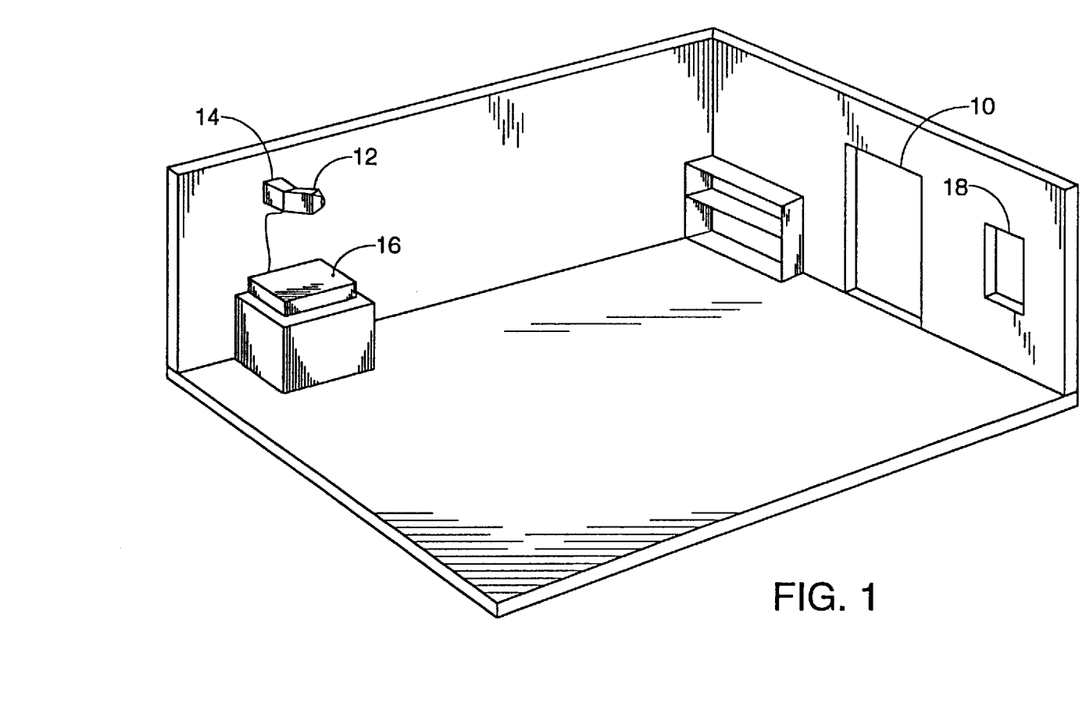
FIG. 1 illustrates a cutaway view of a room having a camera disposed therein for monitoring a door opening.

Referring now to FIG. 1, there is illustrated a cutaway view of a room having an opening 10 disposed therein, which room is monitored by a video camera 12. The camera 12 is typically mounted on an upper portion of one of the walls by a mounting bracket 14. The camera 12 is operable to be connected to a phone line or to a VCR 16. In accordance with the present invention, the VCR 16 has included therein circuitry to allow the VCR to only be operated when a change occurs in the scene that is in the display field of camera 12. As long as no change occurs in the scene within the display field of the camera 12, this including the door and a window 18, the VCR 16 will be maintained in an off position. However, if an individual enters the room through the door 10, this will cause a change between two of the frames, and possibly more than two of the frames, received by the camera 12, it being noted that frames occur for every vertical sync pulse. The system of the present invention will compare the two frames together, as will be described hereinbelow, and then turns the VCR 16 on for a predetermined period of time or for as long as the scene continues to change. Note that this is not a motion detector and, as will be described hereinbelow, changes over longer periods of time can also be accounted for.

Figure 2:
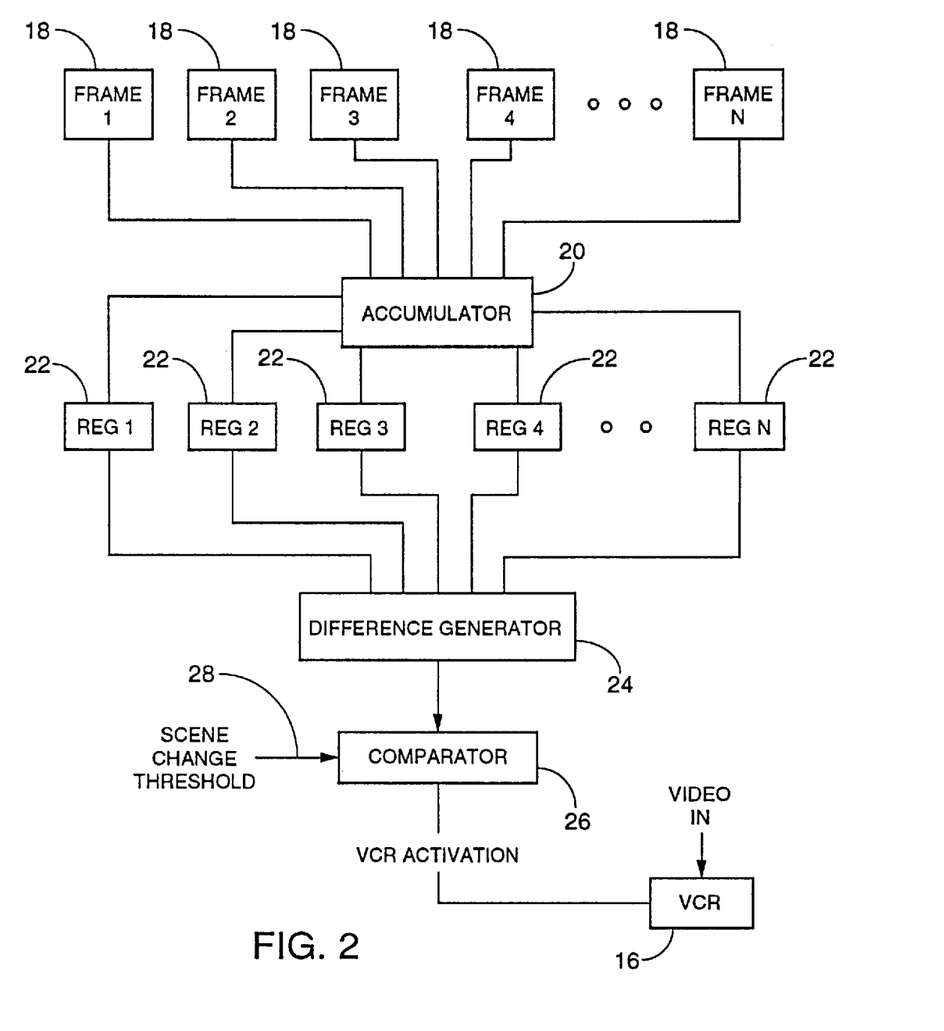
FIG. 2 illustrates a block diagram of the present invention.

Referring now to FIG. 2, there is illustrated a schematic representation of the present invention. The camera 12 is operable to generate multiple frames on the output thereof, these frames being defined as a plurality of pixels of data separated by the vertical sync pulses, it being noted that each frame is a plurality of scan lines, each scan line containing the same number of pixels of information. Each of the pixels is initially output in analog format and can be converted to a digital format for processing thereof. In FIG. 2, n frames of information are illustrated as frames 18. Each of the frames 18 is input to an accumulator 20, which accumulator 20 is operable to take each frame 18 when generated and sum the value of all the pixels therein and take an average thereof, this average stored in one of n registers 22. However, the sum of the pixels in a frame could be utilized, or any algorithm result performed on substantially all the pixels in a given frame. Therefore, each of the registers 22 contain a single value which represents the accumulated average value for the associated one of the frames. For example, the frame 18 labelled FRAME 1 has associated therewith a register 22 labelled REG 1.

In accordance with a predetermined decision making algorithm, the differences of select ones of the registers 22 is determined by a difference generator 24, this providing an output value. This is input to a comparator 26 which compares the value output by the difference generator 24 with a scene change threshold input on a line 28. If the value output by the difference generator 26 exceeds the threshold on line 28, this results in the output of a VCR activation signal for input to the VCR 16. This will activate the VCR 16 and record the video on tape for a predetermined amount of time. In the preferred embodiment, this is an IR link.

It can be seen from the system of FIG. 2 that each frame of information generated by the camera 12 is converted to a single number and then select ones of the frames can be compared to each other merely by comparing the single number. No frame buffer is required, which significantly reduces the amount of memory required in the system. Further, the processing time is also reduced, as the ability to sum an average during a given frame occurs during the frame time and, thereafter, the comparison of various numbers is a relatively straightforward and fast process. By this technique, an individual entering a room which is within the display field of the camera 12 will cause the value of the pixels associated with that individual's outline to change. This will result in a change in the overall accumulated value of the frame, indicating a scene change.

Figure 3:
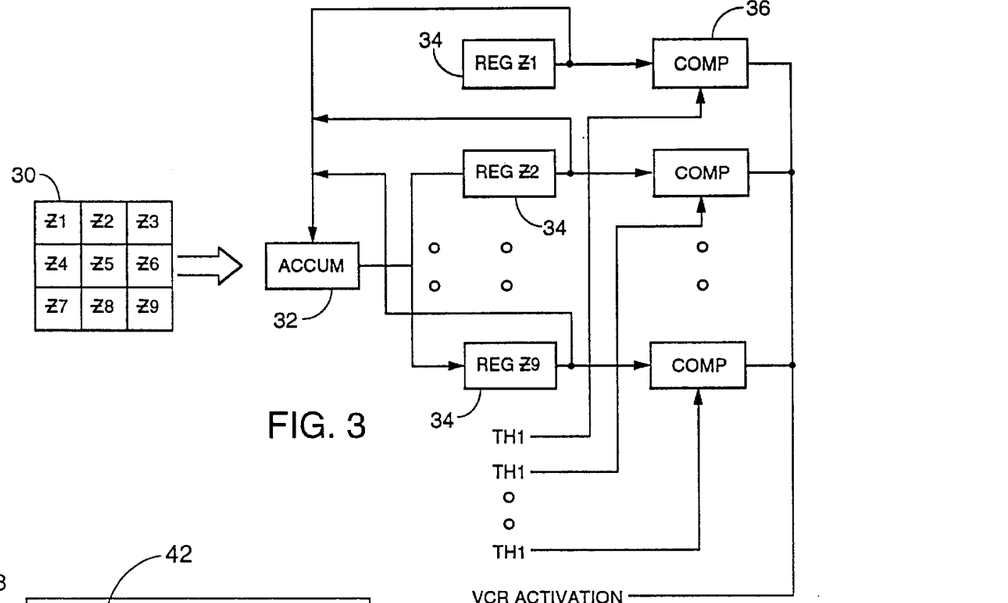
FIG. 3 illustrates one embodiment for viewing multiple zones in a display.

Referring now to FIG. 3, there is illustrated an alternate embodiment wherein multiple zones are defined in a display field 30, these labelled Z1–Z9. For simplicity purposes, the display field 30 is divided up equally into nine equal area zones. As a horizontal scan line progresses across the display field 30, it will traverse three zones. During the first zone Z1, the pixels associated with that horizontal line will be accumulated and summed into one buffer and, at the end of the zone Z1, the horizontal scan line enters the zone Z2 and these values are then accumulated in a register associated only with that zone. This continues for all of the zones. It is only necessary to determine the stop and start points in both the vertical and horizontal directions for each of the directions in order to know which pixel information goes with each zone buffer for the accumulation process.

The pixel information from the display 30 is output to an accumulator 32, which is operable to interface with a plurality of the registers 34 and accumulate data in each of the registers 34 for the given frame 30. There are a plurality of registers 34 for each of the zones such that multiple frames can be viewed. For example, if it was desired to look at ten sequential frames, there would be ten frames 34 labeled REG Z1 for zone Z1 and ten registers 34 labelled REG Z9 for zone Z9. This would allow ten frames of information over time to be stored and later compared. The comparison operation is provided by comparators 36, one of which is associated with each set of registers 34 for each of the zones Z1–Z9. Each of the comparators 36 is connected to the VCR ACTIVATION output line such that any one of the comparators 36 going high representing a "true" comparison would result in the VCR ACTIVATION signal going high. However, each of the comparators 36 has a separate threshold TH1–TH9. As such, each of the zones can have a different sensitivity associated therewith. For example, the periphery of a display field may be relatively insensitive to change due to the fact that little change occurs in the periphery of a field. Therefore, the threshold associated with that area need not be high. This would reduce the possibility of false alarms. Further, if a smaller grid of zones were compared, this information could be correlated to indicate that not only did the accumulated value exceed the threshold, indicating a scene change, but also that the change propagated in a certain direction across the display field.

Figure 4:
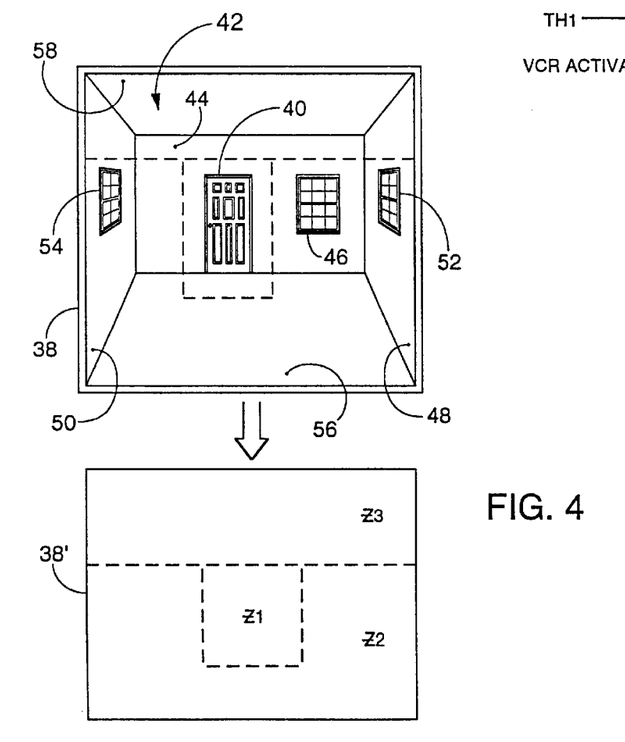
FIG. 4 illustrates an alternate embodiment of the arrangement of the select zones in the display.

Referring now to FIG. 4, there is illustrated an alternate embodiment depicting a different arrangement of zones in a display field 38. The display field 38 is illustrated as being centered on a door 40 in a room 42. The room typically has a back wall 44 which has the door 40 disposed therein, the back wall 44 also having a window 46 associated therewith. Two side walls 48 and 50 are also associated with the display 38, the walls 48 and 50 having windows 52 and 54, respectively, associated therewith. A floor 56 intersects with the back wall 44 and a ceiling 58 intersects with the top of the back wall 44.

For the purpose of scene change, the windows will be of little importance, but the door would be of primary concern. Therefore, to prevent false alarms, the door would be the area of greatest interest. To this end, the room is divided into three zones, Z1, Z2 and Z3, these illustrated in the actual display output in display 38'. The display output 38' represents pixel outputs that would be generated. Zone Z2 will include the floor 56, a portion of the wall 48 and the wall 50, including the windows 52 and 54. The zone Z3 will include the region of the back wall 44 above the door 40 and the portion of the walls 48 and 50 above the respective windows 52 and 54. The zone Z3 will also include the ceiling 58. The zone Z1, including the door 40, will have a lower threshold associated therewith to render it more sensitive. The next sensitive zone will be zone Z2, this including the windows 46, 52 and 54 and also the floor 56. The least sensitive zone will be the zone Z3.

Figure 5:
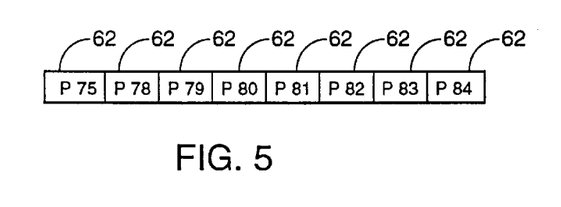
FIG. 5 illustrates a schematic representation of the data stream of the pixels.

Referring now to FIG. 5, there is illustrated a portion of the data output of the camera 12 after digitizing thereof. As described above, pixels are sequentially generated, since the generation of the display field in the scanning operation is sequential. In general, the output of the camera 12 will typically be an analog value across the horizontal scan line. This analog value is sampled at predetermined locations therealong and converted to a pixel by dividing up the scan line. This is a conventional technique. Therefore, the pixel output of the VCR 12 after digitizing thereof will represent a serial data stream of adjacent pixels that are synchronized to the horizontal scan clock. This will require the generation of a data clock, which data clock will define the start and stop of a given word representing the digital value of the pixel. These are represented as fields 62 in the data stream of FIG. 5. At the end of each horizontal scan line, there will be a horizontal scan pulse, and at the end of each frame, there will be generated a vertical scan pulse. The synchronization and generation of the pixel data is conventional and will not be described in detail herein.

Figure 6:
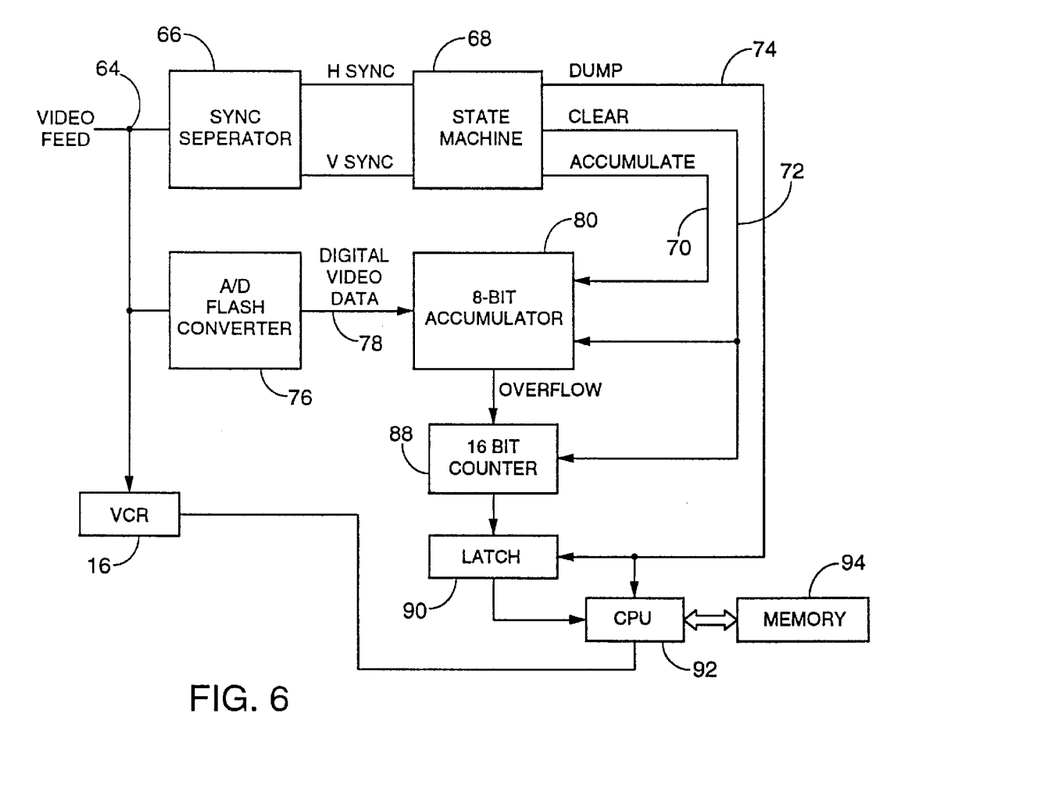
FIG. 6 illustrates a schematic block diagram of the scene change monitor of the present invention.

Referring now to FIG. 6, there is illustrated a block diagram of the scene change monitor of the present invention. The video feed information is input on a line 64 as an analog signal. This is input to the conventional sync separator 66 which outputs the horizontal sync pulses and vertical sync pulses. These are input to a state machine 68 which generates the various clocks such as the data clock and the sync clock, etc. The state machine is operable to generate an Accumulate signal on a line 70 at the beginning of a frame and generate a Clear signal 72 at the end of a frame and also in between samples as will be described hereinbelow. The Clear signal 70 represents multiple signals. At the end of the frame, there is also a Dump signal output on the line 74.

The video data on line 64 in the analog format is also input to a flash A/D converter 76, the output of which generally comprises the digital video data on a line 78. This is input to an 8-bit accumulator 80, which is initiated upon the Accumulate operation, with line 70. Also, the operation of the 8-bit accumulator is cleared initially to start the operation. The output of the 8-bit accumulator 80 is an overflow bit. Each time the 8-bit accumulator is filled, the overflow bit is generated and this is input through the clock input of a 16-bit counter 88. The 16-bit counter is incremented for each overflow of the 8-bit accumulator 80. This continues until the end of the frame, which is indicated by the Dump signal on line 74. A latch 90 is connected to the output of the 16-bit counter 88 which is operable to latch the value therein. The output of the latch 90 is input to a CPU 92 which is operable to buffer and average the outputs of the latch 90 for eight frames in the preferred embodiment to provide a single accumulated frame value at the end of each eight frames, and store this accumulated frame value in a memory 94. However, it should be understood that the values could be averaged over more than 80 frames or less than 80 frames or the averaging function could be accomplished with any type of algorithm. It is only necessary that a single value be stored for a given frame or group of frames. Of course, as described above, these values also could be stored for given zones in a frame. The CPU 92 controls the VCR 16 by generating the VCR ACTIVATION signal, and VCR 16 is operable then to receive video information on the line 64 for recording thereof under the control of the CPU 92.

Figure 7:
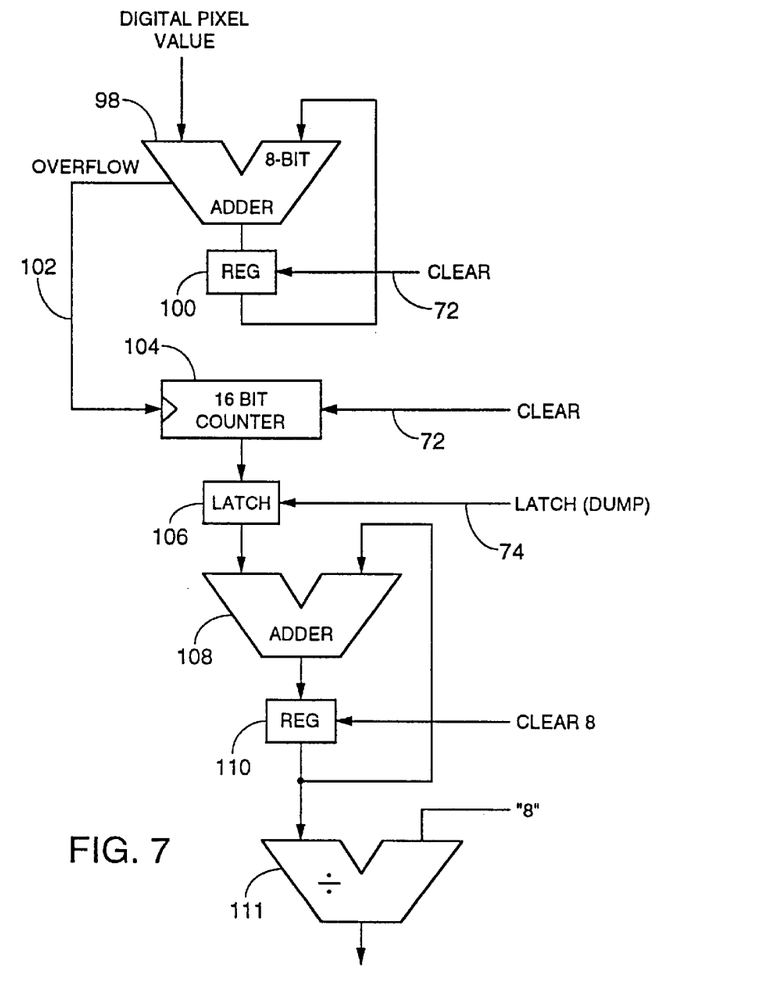
FIG. 7 illustrates a detailed logic diagram of the accumulator.

Referring now to FIG. 7, there is illustrated a detail of the accumulation operation. The digital pixel values output by the A/D converter 76 are input to one input of an 8-bit adder, the output thereof input to a register 100. The output of the register 100 is input to the second input of the adder 98. Upon the beginning of a frame, the Clear signal is generated on the line 72 and the register is cleared to a value of 0. Thereafter, the digital pixel values for each pixel in the stream of pixels for a given frame are accumulated. Each time the 8-bit adder 98 overflows, an overflow bit is generated on a line 102. This is input to the clock input of a 16-bit counter 104, which is identical to the 16-bit counter 88. At the beginning of the frame, the Clear signal is generated on the line 72 to reset the counter 104. Thereafter, the count value is incremented for each overflow bit generated from the 8-bit adder 98. This continues until the latch signal is generated on the line 74, the Dump signal. The output is then latched into a latch 106, which is identical to the latch 90 in FIG. 6. The accumulator 80 is comprised of the 8-bit adder 98 and register 100, whereas the 16-bit counter 88 is represented by the counter 104 and the latch 90 is represented by the latch 106. The CPU 92 is then operable to perform an averaging operation. This averaging operation basically sums and averages eight frames of accumulated data to provide a single accumulated output. The output of the latch 106 is input to one input of an adder 108, the output thereof input to a register 110. The output of the register 110 is fed back into the input of the adder 108. The register 110 is cleared every eight accumulation cycles, or once every time the Clear signal on line 72 is generated. This is referred to as a Clear8 signal. The output of the register will then comprise the summation for eight frames. This information is input to a divide circuit 111, which is operable to divide the contents in the register 110 by a value of "8".

Figure 8:
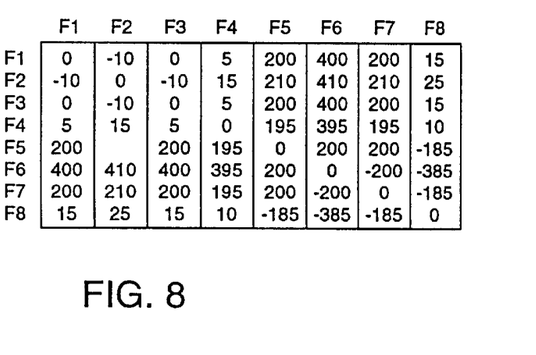
FIG. 8 illustrates a matrix of comparisons for multiple frames.

Referring now to FIG. 8, there is illustrated a delta matrix that can be generated by the CPU 92 for the difference values between frames. The horizontal axis on the upper side of the matrix of FIG. 8 has the frames F1 through F8 associated therewith and the vertical axis on the left of the matrix of FIG. 8 has the frames F1 through F8 illustrated. The values in the matrix represent the difference between the accumulated values. In the matrix of FIG. 8, an example is illustrated wherein an individual passes before an averaged opening, such as a door, in the display such that in averaged frame F5 (averaged over eight adjacent frames), the individual is partially within the doorway, in averaged frame F6, the individual is totally within the doorway, and in averaged frame F7, the individual is only partially within the doorway. By frame F8, the individual is out of the doorway. In averaged frame F2, a small change takes place resulting in a negative number as compared to the value in averaged frame F1. In averaged frame F4, there is a positive change relative to averaged frame F1 and, in averaged frame F8, there is slightly more positive change relative to F1, as compared to that of F4 relative to F1. However, it can be seen that the change in averaged frame F5 relative to averaged frame F1 is a value of 200 and the difference in F6 relative to F1 is approximately 400, indicating the individual has moved from being partially within the doorway to fully within the doorway. When the individual is back to a position partially within the doorway in averaged frame F7, the difference of F7 relative to F1 is reduced again to a value of 200. However, it can be seen that if the threshold were set to a difference of 250, only comparing adjacent frames would not trigger the threshold. If the frames were compared over four frames, i.e., a present frame being compared with a frame that occurred four frames in the past, then a larger threshold would exist. For example, F5 compared to F1 would only result in a difference of 200, whereas averaged frame F6 compared to averaged frame F2 would result in a difference of 410, this being sufficient to trigger the threshold.

The purpose for comparing frames over time is such that an individual cannot move slowly through a field of view, thus allowing only minimal changes to occur as the scene changes slowly. Typically, most scene changing monitoring systems will have some tolerance for noise, and such slow changes would result in no activation by conventional monitors. By only having an accumulated value and determining the difference therebetween, the processing time for comparing multiple frames to each other and generating a history over frames in time is facilitated by the present invention.

Figure 9:
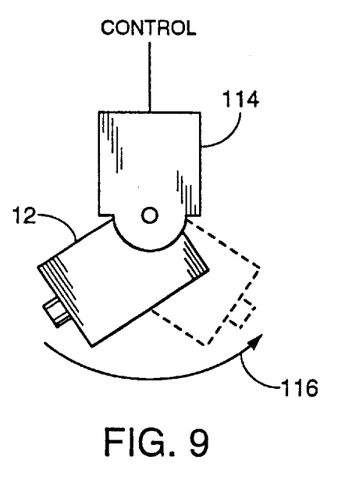
FIG. 9 illustrates a scanning camera.

Referring now to FIG. 9, there is illustrated a scanning operation wherein the camera 12 is scanned about the monitoring area. A stepper motor 114 is provided that is operable to incrementally move the camera 12 about an arc 116. Typically, 16–20 steps will result. Since the stepper motor 114 is relatively accurate, each step will result in the same scene being present the next time the camera 12 is disposed at that step. Therefore, an accumulated value for each step can be generated for each scan and, on the next scan, another accumulated value for that step generated, although typically a plurality of frames are generated at each step. It is only necessary to compare the accumulated values in association with the steps to determine if a scene change had occurred at the previous display, rather than disposing a camera at a given position and determine that its scene changes at that position. This allows the camera to be scanned at a faster rate. Of course, the operation of the stepper motor 114 must be synchronized with the video rate.

Figure 10:
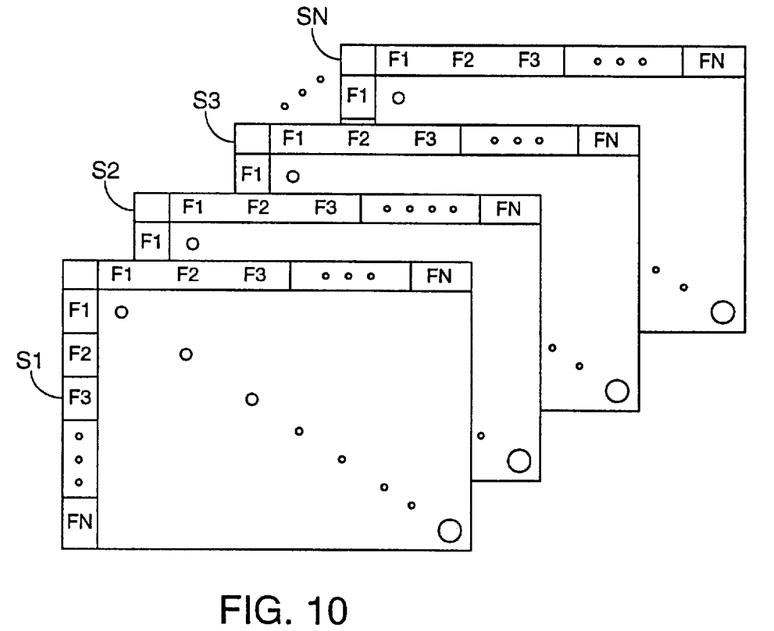
FIG. 10 illustrates the matrixes that result from the scanning camera for multiple steps.

Referring now to FIG. 10, there is illustrated the arrangement in memory of the delta matrices for each scanned position of the camera 12 controlled by the stepper motor 114 for averaged frames F1 through FN. These are represented by delta matrices S1, S2 through SN for N positions of the stepper motor 114.

Figure 11:
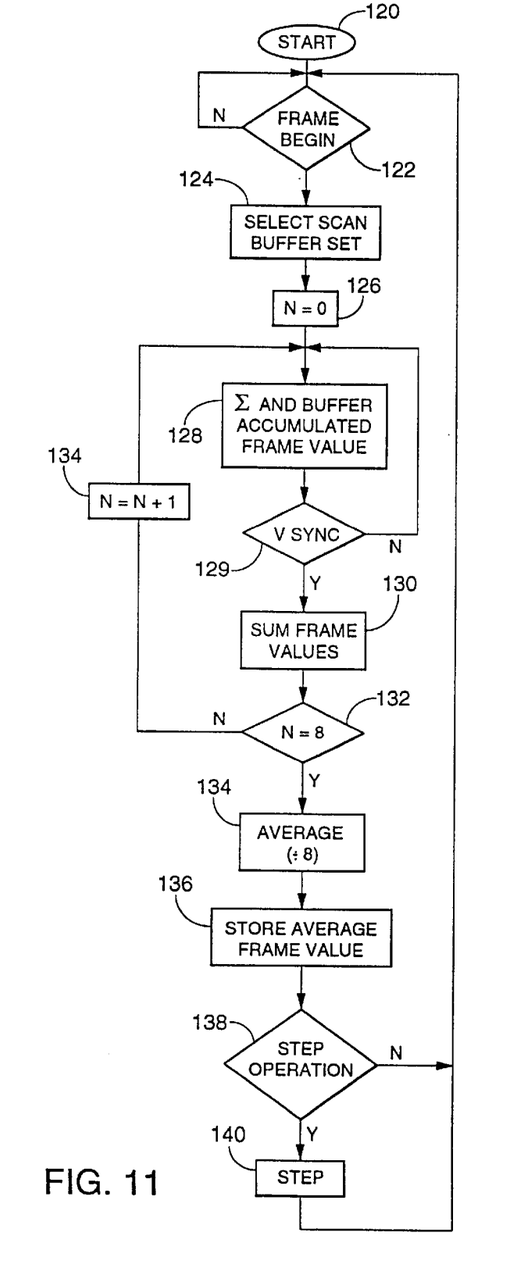
FIG. 11 illustrates a flowchart depicting the operation of the present invention for generating the accumulated value.

Referring now to FIG. 11, there is illustrated a flowchart depicting the program for performing the overall accumulation operation. The program is initiated at a start block 120 and proceeds to a decision block 122 to determine if the frame has been initiated after a vertical sync pulse. If not, the program flows along an "N" path back to the input of the decision block 122. When the frame begins, the program flows along the "Y" path to a function block 124 to select the appropriate scan buffers. As described above, if a scanning video camera is utilized, each position has an associated buffer set. However, if only a single position camera is utilized, only one scan buffer set is provided. After the scan buffer set has been selected, the program flows to a function block 126 to set the value of "N"=0, N being an arbitrary constant. In the preferred embodiment, the value of N is set to 8. The number of frames over which each accumulated frame value is averaged. The program then flows to a function block 128 to perform the summation operation for a given frame. The program flows to a decision block 129 to determine if the vertical sync pulse has been generated. If not, the program flows back to the input of function block 128 to continue summing the pixel values. When the vertical sync pulse has been generated, the program flows along a "Y" path to a function block 130 to sum the frame values in a buffer. The program then flows to a decision block 132 to determine if the value of N is equal to 8. If not, the program flows back along an "N" path to a function block 134 to increment the value of N and then back to the input of the function block 128, wherein the accumulated frame value is cleared and a new accumulation operation for a single frame is initiated.

After eight frames worth of accumulated values have been summed in the buffer with the function block 130, the program flows from decision block 132 along a "Y" path to a function block 134, wherein the value stored in the summation buffer for all the frame values over eight frames is averaged by dividing that value by a factor of eight. The program then flows to a function block 136 to store the averaged frame value in the memory and then to a decision block 138. The decision block 138 determines whether the system is in a scanning mode, i.e., whether the camera is scanning to different positions. If not, the program flows along an "N" path back to the input of the decision block 122. However, during the scanning operation, the program will flow along the "Y" path to a function block 140 to step the camera to the next position and then back to the input of the decision block 122. However, it should be understood that the stepping operation could occur prior to the decision block 132, such that only a single frame of information would be obtained for each step, this requiring eight scans of the given position before an average frame value is generated and stored. However, the stepping operation can be achieved such that eight frames could be obtained at each position of the camera.

Figure 12:
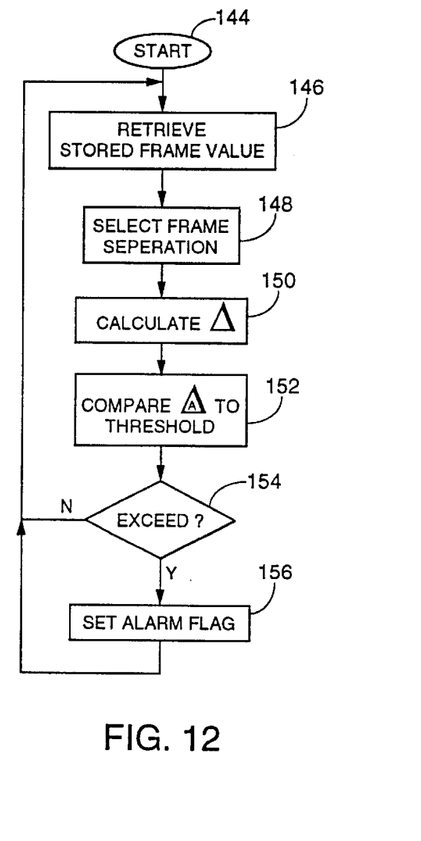
FIG. 12 illustrates a flowchart depicting the alarm operation and comparison operation.

Referring now to FIG. 12, there is illustrated a flowchart depicting the program for performing the compare operation. The program is initiated at a start block 144 and then proceeds to a function block 146 to retrieve the stored frame values. The program then flows to a function block 148 to select the frame separation, depending upon the comparison that is required. As required above, a separation of, for example, five frames could be utilized such that a current frame is compared with the value of the frame that existed five frames in the past. The program would then flow to a function block 150 to calculate the delta or difference between the two frame values. The program then flows to a function block 152 to compare the difference to a predetermined threshold. The program then flows to a decision block 154 to determine if the calculated delta exceeds the threshold delta. If not, the program flows along an "N" path back to the input of decision block 146 to retrieve another value. If not, the program flows along a "Y" path to a function block 156 to set an alarm flag, which is utilized by the CPU 92 to generate the VCR activation signal. The program would then flow to the input of the function block 146.

In summary, there has been provided a system for monitoring changes in a scene which is viewed by a camera. The camera is operable to generate sequential frames in time of the scene and divide each of the frames into a plurality of pixels. The value of each of the pixels represents a specific area of the scene. These values are summed for each frame to generate a frame value. The frame values are then stored in a memory. Select ones of the frame values can then be compared to determine whether the value has changed. This is achieved by generating the difference between select ones of the frame values and then comparing this difference to a predetermined threshold. When the difference between the select frame values exceeds the threshold, this indicates that something has happened in the field of view. This information can then be utilized to trigger a VCR to initiate a recording of the scene for a predetermined amount of time.

Although the preferred embodiment has been described in detail, it should be understood that various changes, substitutions and alterations can be made therein without departing from the spirit and scope of the invention as defined by the appended claims.

What is claimed is:

1. A scene change monitor for monitoring a given scene, comprising:

a display device for converting said scene into a plurality of sequentially generated pixels to represent a frame at a given time, said display device operable to generate a plurality of frames, each of said pixels having a video value representing the relative intensity of said pixel in said associated frame;

an accumulator for generating a single value for each of said frames, said single value for a given one of said frames representing the average intensity of substantially all of said pixels associated with said given frame, said accumulator operating on said pixels in said given frame as they are sequentially generated such that said video values for all of said pixels in said given frame are not stored;

a memory for storing said single value for select ones of said frames;

an averaging circuit for averaging each of said stored single values with single values for a predetermined number of adjacent frames and generating a single accumulated frame value for the frame associated with said each stored single value for storage in said memory; and a comparison circuit for comparing select ones of said stored single accumulated frame values that are associated with different frames that are not adjacent to each other and outputting a scene change alarm if the comparison of said select accumulated frame single values meets user defined comparison criteria.

2. The scene change monitor of claim 1, wherein said display device comprises a camera for converting said given scene into analog video signals, and circuitry for converting said analog video signals to pixels representing individual segments of said given scene.

3. The scene change monitor of claim 1, wherein said comparison circuit comprises:

a difference generator for calculating the difference between select ones of the stored accumulated frame single values;

a comparator for comparing the output of said difference generator with a predetermined threshold; and an alarm device for generating said scene change alarm when the output of said difference generator is determined by said comparator to exceed said threshold.

4. The scene change monitor of claim 1, wherein said accumulator is operable to sum all of the video values of all of the pixels in said given frame to provide said associated single value.

5. The scene change monitor of claim 4, wherein said accumulator is operable to divide said sum by a predetermined value to generate said associated single value.

6. The scene change monitor of claim 1, wherein said display device is divided into predetermined zones and said accumulator is operable to generate a single value for each of said zones for each of said frames, with said associated single value for each of said frames for each of said zones representing the average intensity of substantially all of said pixels associated with each of said zones in each of said frames, and wherein said memory is operable to store said single values for select ones of said frames and their associated zones.

7. The scene change monitor of claim 1 wherein said display device is operable to scan said given scene in different positions and divide said given scene into segments, wherein different segments of said given scene are displayed at different intervals of time, said scanning operation being repetitive such that each of said segments of said given scene is scanned at a predetermined time, and wherein said comparison circuit is operable to only compare said select ones of said stored single values associated with said frames that correspond to the same one of the scanned segments of said given scene scanned by said display device.

8. A system for recording a scene when a change has occurred in the scene, comprising:

a display device for converting said scene into a plurality of sequentially generated pixels to represent a frame of pixels at a given time, and said display device operable to generate a plurality of sequential frames, each of said pixels having a video value representing the relative intensity of said pixel in said associated frame;

an accumulator for generating a single value for each of said frames, said single value for a given one of said frames representing the average intensity of substantially all of said pixels associated with said given frame, said accumulator operating on said pixels in said given frame as they are sequentially generated such that said video values for all of said pixels in said given frame are not stored, a memory for storing said single value for select ones of said frames;

an averaging circuit for averaging each of said stored single values with said single values for a predetermined number of adjacent frames and generating a single accumulated frame value for the frame associated with said each stored single value for storage in said memory;

a comparison circuit for comparing select ones of said stored single accumulated frame values that are associated with different frames that are not adjacent to each other and outputting a scene change alarm if the comparison of said select single accumulated frame values meets user defined comparison criteria; and a recording device for being activated by said scene change alarm and recording the scene output by said display device.

9. The system of claim 8, wherein said display device comprises a camera for converting said given scene into analog video signals, and circuitry for converting said analog video signals to pixels representing individual segments of the given scene, said analog video signals input to said recording device.

10. The system of claim 8, wherein said compare circuit comprises:

a difference generator for calculating the difference between select ones of the stored single accumulated frame values;

a comparator for comparing the output of said difference generator with a predetermined threshold; and an alarm device for generating said scene change alarm when the output of said difference generator is determined by said comparator to exceed said threshold.

11. The system of claim 8, wherein said accumulator is operable to sum all of the video values of all of the pixels in said given frame to provide said associated single value.

12. The system of claim 11, wherein said accumulator is operable to divide said sum by a predetermined value to generate said associated single value.

13. The system of claim 8, wherein said display device is divided into predetermined zones and said accumulator is operable to generate a single value for each of said zones for each of said frames, with said associated single value for each of said frames for each of said zones representing the average intensity of substantially all of said pixels associated with each of said zones in each of said frames, and wherein said memory is operable to store said single values for select ones of said frames and their associated zones.

14. The system of claim 8 wherein said display device is operable to scan said given scene in different positions and divide said given scene into segments, wherein different segments of said given scene are displayed at different intervals of time, said scanning operation being repetitive such that each of said segments of said given scene is scanned at a predetermined time, and wherein said comparison circuit is operable to only compare said select ones of said stored single values associated with said frames that correspond to the same one of the scanned segments of said given scene scanned by said display device.

15. A method for monitoring a given scene, comprising the steps of:

converting the scene into a plurality of sequentially generated pixels to represent a frame of pixels at a given time as a given frame, and the step of converting operable to generate a plurality of sequential frames, each of the pixels in each of the frames having a video value representing the relative intensity of the pixel in the associated frame;

generating a single value for each of the frames, the single value for the given frame representing the average intensity of substantially all of the associated pixels, the step of generating operating on the pixels in the given frame as they are sequentially generated such that the video values for all of the pixels in the given frame are not stored;

storing in a memory the single value for select ones of the frames;

averaging each of the stored single values with the single values for a predetermined number of adjacent frames and generating a single accumulated frame value for the frame associated with said each stored single value for storage in the memory; and comparing select ones of the stored single accumulated frame values that are associated with different frames that are not adjacent to each other and outputting a scene change alarm if the comparison of the select single accumulated frame values meets user defined comparison criteria.

16. The method of claim 15, wherein the step of converting comprises converting said given scene into analog video signals with a camera, and converting the analog video signals to pixels representing individual segments of the given scene.

17. The method of claim 15, wherein the step of comparing comprises:

calculating the difference between the select ones of the stored single accumulated frame values;

comparing the difference with a predetermined threshold; and generating the scene change alarm when the difference is determined by the step of comparing to exceed the threshold.

18. The method of claim 15, wherein the step of generating is operable to sum all of the video values of all of the pixels in the given frame to provide the associated single value.

19. The method of claim 18, wherein the step of generating is operable to divide the sum by a predetermined value to generate the associated single value.

20. The method of claim 15, wherein the step of converting comprises dividing the scene into predetermined zones and generating a single value for each of the zones for each of the frames, with the associated single value for each of the frames for each of the zones representing the average intensity of substantially all of the pixels associated with each of the zones in each of the frames, and wherein the step of storing is operable to store the single values for select ones of the frames and their associated zones.

21. The method of claim 15 wherein the step of converting comprises scanning the given scene in different positions and dividing the given scene into segments, wherein different segments of the given scene are displayed at different intervals of time, said scanning operation being repetitive such that each of the segments of the given scene is scanned at a predetermined time, and wherein the step of comparing is operable to only compare select ones of the stored single values associated with frames that correspond to the same one of the scanned segments of the given scene scanned by the step of scanning.

22. A method for recording a scene where a change has occurred in the scene, comprising the steps of:

converting the scene into a plurality of sequentially generated pixels to represent a frame of pixels at a given time as a given frame, and the display device operable to generate a plurality of sequential frames, each of the pixels having a video value representing the relative intensity of the pixel in the frame;

generating a single value for each of the frames, the single value for each of the frames representing the average intensity of substantially all of the associated pixels, the step of generating operating on the pixels in the given frame as they are sequentially generated such that the video values for all of the pixels in the given frame are not stored;

storing in a memory said single values for select ones of said frames;

averaging each of the stored single values with the single values for a predetermined number of adjacent frames and generating a single accumulated frame value for the frame associated with said each stored single value for storage in the memory;

comparing select ones of the stored single accumulated frame values that are associated with different frames that are not adjacent to each other and outputting a scene change alarm if the comparison of the select single accumulated frame values meets predetermined comparison criteria; and activating a recording device in response to the generation of the scene change alarm to record the scene.

23. The method of claim 22, wherein the step of converting comprises converting a predetermined scene into analog video signals with a camera, and converting the analog video signals to pixels representing individual segments of the scene.

24. The method of claim 22, wherein the step of comparing comprises:

calculating the difference between select ones of the stored single accumulated frame values;

comparing the output of the step of calculating with a predetermined threshold; and generating the scene change alarm when the output of the step of calculating is determined by the step of comparing to exceed the threshold.

25. The method of claim 22, wherein step of generating is operable to sum all of the video values of all of the pixels in a given one of the frames to provide said associated single value.

26. The method of claim 25, wherein the step of generating is operable to divide the sum by a predetermined value to generate the associated single value.

27. The method of claim 22, wherein the scene is divided into predetermined zones and the step of generating is operable to generate a single value for each of the zones for each of the frames, with the associated single value for each of the zones representing the average intensity of substantially all of the pixels associated with each of the zones in each of the frames, and wherein the step of storing is operable to store the single values for select ones of the frames and their associated zones.

28. The method of claim 22 wherein the step of converting is operable to scan the given scene in different positions and divide the scene into segments, wherein different segments of the given scene are displayed at different intervals of time, the scanning operation being repetitive such that each segment of the given scene is scanned at a predetermined time, and wherein the step of comparing is operable to only compare select ones of the stored single values associated with frames that correspond to the same one of the scanned segments of the given scene that is scanned.

* * * * *